United States Patent [19]
Inderwick

[11] 3,954,480
[45] May 4, 1976

[54] CONCRETE COMPOSITIONS AND PREFORMED ARTICLES MADE THEREFROM

[76] Inventor: Anthony Frederick Inderwick, 185 Highway 15, Ottawa, Canada, K2H5Z2

[22] Filed: June 21, 1974

[21] Appl. No.: 481,772

[30] Foreign Application Priority Data
June 25, 1973  United Kingdom................ 30169/73

[52] U.S. Cl..................................... 106/90; 106/70; 106/97
[51] Int. Cl.² ............................................ C04B 7/02
[58] Field of Search........................... 106/70, 97, 90

[56] References Cited
UNITED STATES PATENTS

| 135,721 | 2/1873 | Monk | 106/70 |
|---------|--------|------|--------|
| 343,198 | 6/1886 | Poole | 106/70 |
| 1,808,081 | 5/1929 | Sullivan | 106/70 |
| 2,280,301 | 4/1942 | Ray | 106/70 |
| 3,181,960 | 5/1965 | King et al. | 106/70 |

Primary Examiner—J. Poer

[57] ABSTRACT

Concrete compositions, concrete articles and methods of producing the articles are disclosed in which a portion of the cement is replaced by sulfur, preferably plasticized sulfur. Cost saving is thereby achieved and the articles exhibit improved scaling resistance on exposure to acid and on freeze-thaw cycling in a sodium chloride-containing environment.

3 Claims, No Drawings

CONCRETE COMPOSITIONS AND PREFORMED ARTICLES MADE THEREFROM

This invention relates to concrete compositions, to a method of forming articles therefrom, and to the articles so formed.

Hitherto, articles such as preformed concrete paving slabs, structural members and other articles have been formed from concrete comprising a mixture of cement, such as Portland cement, aggregate and water, plus various optional additives such as colouring or waterproofing agents, together in some instances with steel or other reinforcement. The aggregate is coated with a Portland cement paste in a concrete mixture and the resultant slurry is compacted in a mould to produce a desired shape. Hydration of the cement paste is then allowed to take place over a period of time to form the concrete article.

Concrete paving slabs formed in this way have reasonable durability and strength, although in rigorous climates the useful life is less than desirable, particularly when the usual freeze-thaw Winter environment is supplemented by the presence of salt or other chemicals used in snow clearance. As a result, periodic replacement of concrete slabs used in sidewalk construction and other municipal or domestic situations must be anticipated and naturally contributes to the overall cost. Additionally, the cost of Portland cement has risen steadily in recent years and continues to rise.

On the other hand, sulfur is available in large quantities at relatively low price as a result of sulfur mining as well as extraction as a by-product during oil refining. Normally speaking, sulfur is considered as a brittle, lowstrength material and the mere substitution of a portion of aggregate or cement in concrete by elemental sulfur would not give rise to a satisfactory product.

However, applicant has now discovered that by the use of a special production method and/or a modified sulfur, concrete articles, such as paving slabs, having equivalent or improved strength and durability can be produced at lower overall cost.

According to one aspect of the invention, there is provided a method of producing concrete articles, comprising forming an admixture of cement, aggregate, modified sulfur (as hereinafter defined) and water, shaping the admixture into the desired shape of the article, optionally with compaction, allowing the shaped article to stand to permit partial or complete hydration of the cement therein, heating the article to a temperature near or above the melting point of sulfur and for sufficient time to convert the modified sulfur to a plastic state, and thereafter cooling the article to produce a concrete article having adequate strength and improved weathering durability.

According to another aspect of the invention, there is provided a concrete article exhibiting satisfactory tensile strength and weathering durability suitable for external use in rigorous climates and salt-containing environments, comprising from 10 to 30% in total by weight of hydrated Portland cement and plasticized sulfur, the ratio of sulfur to cement being from 1:4 to 4:1, the balance substantially comprising aggregate.

By the operation of the method of the invention a product is obtained which does not exhibit the normal brittleness of solidified sulfur. Particularly when a modified sulfur is employed, the product exhibits satisfactory ductility and tensile strength and improved durability under freeze-thaw conditions. By the term "modified sulfur" is meant sulfur in the $S_\mu$ allotropic form, or a mixture of normal elemental sulfur with $S_\mu$ sulfur, or elemental sulfur which has been plasticized by the addition of a sulfur plasticizer, for example, dicyclopentadiene, styrene or a terpene polysulfide.

It is desirable for the admixture to be undersaturated with water so as to minimize loss of sulfur plasticizer during compaction. In a preferred embodiment, from 1 to 5% by weight, more preferably about 2 to 4% by weight, of plasticizer is employed based on the sulfur present.

Thus, in one advantageous manner of carrying out the method of the invention, the Portland cement, aggregate, powdered sulfur and water are combined together in a concrete mixture and the resultant concrete paste is then compacted in a machine, press or mould to give the desired shape of article. The green article is allowed to stand to permit the Portland cement to hydrate and develop a certain amount of strength. Thereafter, the article is placed in an oven or otherwise subjected to elevated temperature, so as to sinter or melt the sulfur therein. A temperature of about 300°F has been found satisfactory, while at temperatures above 400°F the problem of loss of sulfur by vaporization is evident. The elevated temperature is maintained until a major part of the sulfur, for example all of the sulfur, is estimated to have melted and become plasticized, and the article is then cooled. Preferably the heating is carried out for from 1 to 5 hours at a temperature of 250° to 350°F.

As indicated above, a total of about 10 to 30% by weight of cement plus sulfur, based on the total composition, is preferably employed in forming the concrete articles of the invention. The portion of the cement replaced by elemental or modified sulfur is preferably from 20 to 75% by weight of the total cement, more preferably from 40 to 60%.

The products of the invention give rise to a number of advantages, including the following:

1. Economic. A lower manufacturing cost in areas where sulphur is available at prices considerably lower than Portland cement. Also, powdered sulphur combined with water can be used and handled in the form of a slurry, provided that the water content is not too high. Sulphur in dry form can prove to be hazardous in handling, grinding, etc., since it can be explosive.

2. Durability. The sulphur-cement-aggregate compositions are more durable under de-icing salt attack than conventional mixes. In some instances this may allow the use of aggregates which would break down under de-icing salt attack in regular concrete mixes.

3. Acid resistance. Sewer pipe is subject to acid attack and corrosion. A lot of attention is now being directed to the testing of acid resistant coatings and treatments of concrete sewer pipe. Certain concrete compositions of the invention are anticipated to be useful in the manufacture of sewer pipe where the whole pipe is made of the acid resistant material instead of merely a surface coating or impregnation liable to loss through abrasion The following Examples illustrate the invention.

EXAMPLE I

A number of slabs of precast concrete of varying composition were prepared, each comprising Portland cement, aggregate and, in some instances, powdered sulfur. The slabs were prepared by mixing the Portland cement, powdered sulfur and aggregate and a suitable amount of water in a concrete mixer to produce an homogenous slurry. The slurry was then compacted in a press under 0.5 ton/sq.in. pressure and the slabs so formed were allowed to stand for 18 hours for the Portland cement to hydrate. Thereafter, all the slabs were placed in an oven and heated to 200°C and maintained at this temperature for 4 hours so as to melt the powdered sulfur in the sulfur-containing slabs.

The slabs were then cooled and subjected to compressive strength testing, 2 inch cube specimens being cut from each slab and subjected to compression testing. The results are shown in the following Table. In each case the ratio of total cement plus sulfur to aggregate as 1:5 and the ratio of sulfur to cement (S:C) was as indicated in Table 1.

TABLE 1

| Specimen | S:C | Compressive strength (psi) |
| --- | --- | --- |
| 1 | 0 | 5420 |
| 2 | 1:3 | 4860 |
| 3 | 1:3 | 4650 |
| 4 | 1:1 | 3830 |
| 5 | 3:1 | 2860 |

It can be seen that, in the case of the sulfur-containing specimens Nos. 2 to 5, slight decrease in strength occurs over the control spcimen 1. The resulting strength is still acceptable, however, for many applications, while the cost will be appreciably reduced.

EXAMPLE II

A similar procedure to Example I was carried out except that 3% by weight (based on the sulfur) of dicyclopentadiene was first mixed with the sulfur as a plasticizer. The admixtures of modified sulfur, cement and aggregate and the control admixtures were undersaturated and compacted in a Rino impactor machine. The slabs were heated to either 300° or 400°F for 3 hours as indicated in Table 2.

Specimens were subjected to slow freeze-thaw cycling in 3% NaCl solution at the rate of one cycle per day for 10 days to simulate a Canadian city street winter environment, and to exposure to 10% sulfuric acid solution by immersion for 10 days. The degree of scaling was determined for each specimen and the results are set out in the following Table 2. In the case of the controls and specimens 3 and 4 the ratio of total cement plus any sulfur to aggregate was 1 to 5, while for specimen 5, the ratio of cement plus sulfur to aggregate was 1 to 3.

TABLE 2

| Specimen | S:C | Compressive strength (psi) | Freeze-thaw cycling— scaling degree (g/cm² of surface) | Acid resistance— scaling degree (g/cm² of surface) |
| --- | --- | --- | --- | --- |
| 1(Control) | 0 | 6100 | 0.033 | 0.37 |
| 2(Control) | 0 | 8310 | 0.047 | 0.37 |
| 3 | 1:1 | 5800 | 0.005 | 0.004 |
| 4 | 3:1 | 5300 | 0.005 | 0.28 |
| 5 | 3:1 | 3750 | 0.005 | 0.013 |

As can be seen from Table 2, the sulfur-containing specimens Nos. 3, 4 and 5 exhibited marked reduction of scaling in the slow freeze-thaw text, while specimens 3 and 5 were particularly good in the acid resistance text. Some reduction of compressive strength was recorded although the values were not unacceptable for many applications.

The composition used in making specimen No. 5 is tentatively envisaged as an acid-resistant material for lining pipes, such as sewer pipes, or for forming such pipes.

The embodiments of the invention in which an exclusive property or privelege is claimed are defined as follows:

1. A method of producing concrete articles, comprising:
    a. forming an admixture of cement, aggregate, plasticizable powdered sulfur, a plasticizer for the sulfur and water, said admixture containing about 10 to 30% by weight of total cement plus sulfur based on the total composition with the ratio by weight of sulfur to cement being from about 1:4 to 4:1, about 1 to 5% by weight of the plasticizer based on the sulfur, and the water in an amount sufficient to hydrolize the cement but insufficient to saturate the admixture,
    b. shaping the admixture into a desired shape,
    c. compacting the shaped admixture,
    d. allowing the compacted product to stand to permit partial or complete hydration of the cement therein,
    e. heating the hydrated product to a temperature near or above the melting point of sulfur to plasticize the sulfur, and
    f. thereafter cooling the resultant concrete article.

2. A method according to claim 1, wherein the plasticizer is selected from the group consisting of dicyclopentadiene, styrene, a terpene polysulfide and mixtures thereof.

3. A method according to claim 1, wherein heatng is carried out for from 1 to 5 hours at a temperature of 250° to 350°F.

* * * * *